Nov. 28, 1933.  A. E. FREEMAN ET AL  1,936,713
WINCH CLUTCH AND BRAKE
Filed Oct. 15, 1932   2 Sheets-Sheet 1

INVENTORS
A.E.Freeman and
BY W.T.Livermore
ATTORNEY

Nov. 28, 1933.  A. E. FREEMAN ET AL  1,936,713
WINCH CLUTCH AND BRAKE
Filed Oct. 15, 1932   2 Sheets-Sheet 2

INVENTORS
A. E. Freeman and
BY W. T. Livermore
ATTORNEY

Patented Nov. 28, 1933

1,936,713

UNITED STATES PATENT OFFICE 1,936,713

WINCH CLUTCH AND BRAKE

Albert E. Freeman, East Orange, N. J., and William T. Livermore, Muncie, Ind., assignors to American Telephone and Telegraph Company, a corporation of New York Application October 15, 1932. Serial No. 633,018

6 Claims. (Cl. 192—18)

This invention relates to hoisting or pulling apparatus such as winches, and more particularly to clutch and brake mechanism therefor.

In the operation of unwinding rope from winches, as in the case of lowering a suspended load, the clutch between the power shaft and winch drum may become accidentally disengaged causing the load to drop suddenly. If not counteracted this action may result in accidents.

Accordingly, it is one of the objects of this invention to provide mechanism for a winch clutch which will force the jaws thereof into positive and complete engagement.

Another object is to provide locking mechanism to prevent accidental engagement or disengagement of the clutch mechanism of the winch with the power drive.

A further object is to provide braking mechanism which will stop the momentum of the winch when power ceases to be applied to its shaft.

These and further objects will be apparent from the following description, when considered in connection with the accompanying drawings, in which one embodiment of the invention is illustrated.

Figure 1:
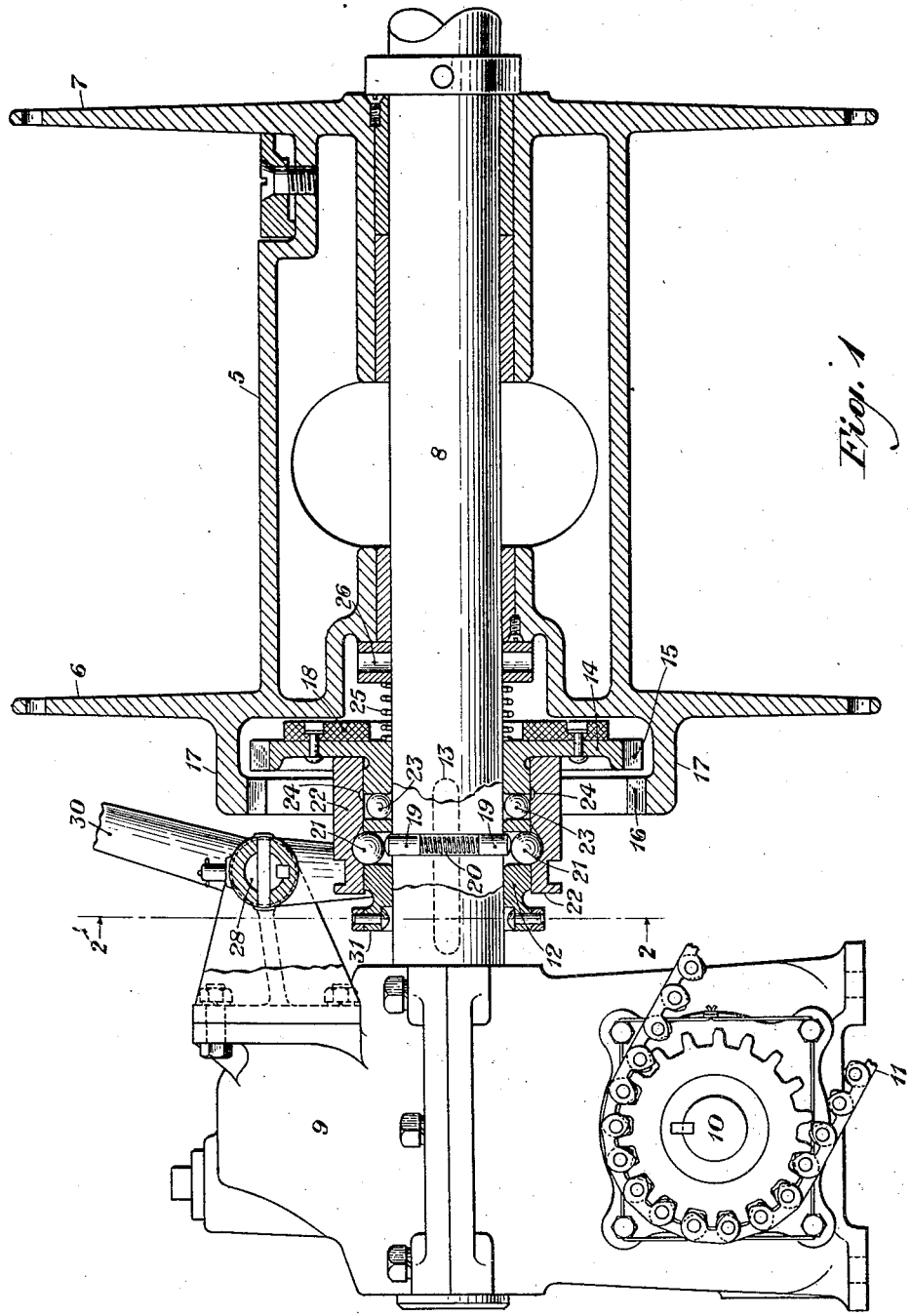
Figure 2:
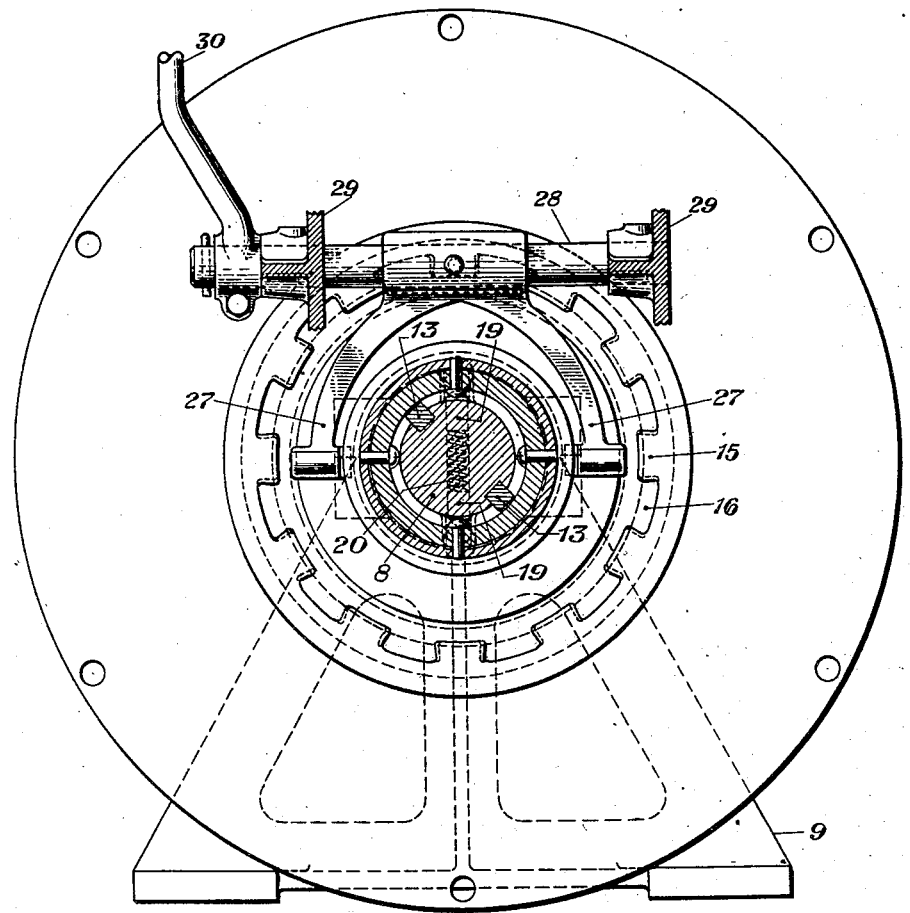

Referring to the drawings, Figure 1 is a side elevation, partly, in section, of the improved mechanism; and Fig. 2 is an end view taken on the line 2—2 of Fig. 1, looking in the direction of the arrows.

In the improved arrangement a winch drum 5 upon which a line of rope or the like may be wound, is shown as having end flanges 6 and 7. This drum may be carried on a truck or the like, and is shown as mounted on a shaft 8 which is journaled at each end on supports or standards, one of which is shown at 9. This standard forms a housing in which suitable gearing is positioned. The gearing is driven through the agency of the sprocket 10, which is connected by means of a chain 11 to a suitable source of power. The driving of the gearing housed in the standard 9 causes the rotation of the shaft 8 in a well known manner.

A sleeve 12 is mounted on one end of the shaft 8 and is adapted to slide longitudinally thereon on keys 13 provided in said shaft. The sleeve 12 carries a flange 14 on one of its ends, the periphery of which is provided with external jaws or teeth 15. These teeth are adapted to engage with internal jaws or teeth 16 on a circular extension 17 which may be integral with the flange 6 at one end of the winch drum. The jaws or teeth 15 of the sleeve 12 and the jaws or teeth 16 of the circular extension 17 engage with each other when the sleeve 12 is moved to the left (Fig. 1) along the shaft 8 and form a clutch connection whereby the shaft and drum are rotated when power is applied to the shaft. The flange 14 has a brake lining or friction disc 18 affixed thereto on its inner face which lies adjacent the outer face of the winch drum flange 6. This disc is adapted to be brought into contact with the flange 6 when it is desired to produce a braking action on the drum to promptly stop it from rotating. When the sleeve 12 is moved along the shaft 8 in one direction to a point where contact between the brake lining 18 and the end of the drum occurs, this braking action becomes effective. When the sleeve 12 is moved along the shaft 8 in the opposite direction or away from the drum, the clutch connection between the peripheral teeth 15 of the sleeve 12 and the internal teeth 16 of the drum provides a drive to rotate said drum, as will presently appear.

To lock the sleeve and drum in driving position with the teeth or jaws of these members in clutch relation as just described, a hole is provided through the winch shaft 8 for the reception of a pair of pins, 19, 19. A spring 20 is positioned in this hole between the pins and exerts outward pressure to normally maintain them in an extended position from the surface of the shaft 8. As shown in Fig. 1 of the drawings, a ball 21 of suitable material is seated on each of the extended ends of the pins 19, and projects through one set of holes in the sleeve 12 into contact with a groove provided in an outer sleeve 22. This latter sleeve slides on the sleeve 12. A second set of holes is also provided through the sleeve 12, and a second pair of balls 23 is contained therein. The balls 23 rest upon the surface of the shaft 8 and a circumferential groove 24 in the outer sleeve 22 is adapted to register with the balls 23 when said sleeve is moved outwardly from the position shown in Fig. 1, or in a direction to the left. It will be noted that, due to the pressure exerted upon the pins 19 by the spring 20, the balls 21 are forced into the groove on the outer sleeve 22 and that the pins 19 are caused to protrude from the surface of the shaft 8. These protruding pins lock the jaw clutch comprising the jaws 15 and 16 in engagement. The large groove in the outer sleeve 22 is of sufficient size to permit slight endwise motion of the clutch for applying and releasing the brake between the brake lining 18 and the end of the winch drum.

A helical spring 25 surrounds the shaft 8 in a position between the collar 26 which is pinned on the shaft 8, and the inner face of flange 14 of the sleeve 12. This spring exerts outward pressure against the slidable sleeve 12 to insure a positive and complete clutch engagement between the jaws 15 and 16 when the pins 19 have been depressed and the instant the clutch jaws start preliminary engagement. The outer sleeve 22 is provided with a groove in which the ends of a shifter fork 27 register. This fork is shown as mounted on a rocker shaft 28 supported by a trunnion 29, and is actuated by a lever 30 in any suitable and well known manner. The lever 30 may be of a type adapted to be operated directly by hand, or it may be connected through linkage and operated from the cab of a truck.

The winch is shown in Fig. 1 as having its flange disengaged, and in this position the brake lining 18 is just out of contact with the end of the winch drum. When the sleeve 12 is moved to the right, the friction surface 18 is brought into contact with the end of drum 5 and produces a braking action on the drum. To engage the clutch, the control handle 30 is moved to slide the outer sleeve 22 to the left from the position shown in Fig. 1. This movement of the handle is continued until the outer edge of the sleeve 22 comes in contact with the ring 31 on the end of the sleeve 12. The balls 21 will be depressed upon this movement of the sleeve 22 and in turn will depress the pins 19, thus unlocking the clutch. Further movement of the sleeve 22 to the left and against the stop 31 will cause the inner sleeve to also move to the left along the shaft 8, and thus cause the engagement of the jaws 15 of the sleeve 12 and the jaws 16 of the drum extension 17. Should the control handle be moved to a point where the jaws 15 and 16 only partially engage with each other, the spring 25 will exert sufficient pressure to accelerate the movement of the movable sleeve to force said jaws together and insure their complete and positive engagement. The small groove 24 in the outer sleeve 22 will now register with the small holes in the inner sleeve 12, which contain the balls 23, and the pins 19 will force said balls outwardly into the groove and the pins 19 will protrude from the surface of the shaft 8. The clutch will thus be locked in engaged position. The clutch is protected from becoming disengaged, due to any tendency of the jaws 15 or 16 to slip, by means of the pins 19, which project above the surface of the drum shaft 8. The clutch can only be moved to a disengaged position after the pins 19 are depressed by moving the sleeve 22 to the right. As soon as the pins 19 are depressed by moving the clutch toward engaged position, the pressure of the spring 25 forces the clutch into positive and complete engagement until such time as the control handle is moved to shift the clutch into disengaged position.

What is claimed is:

1. A winch including a shaft having a drum mounted thereon, a gear member at one end of the drum, means slidably mounted on the shaft and adapted to be moved into a position of clutch engagement with the gear member to drive the drum and into a position of disengagement from said gear member, a control member for the slidable means, means associated with said shaft for accelerating the movement of the slidable means to the first position to insure a positive and complete clutch engagement thereof, and means associated with the shaft, slidable means and control member for locking the slidable means in each position.

2. A winch including a shaft having a drum mounted thereon, a gear member at one end of the drum, means slidably mounted on the shaft and adapted to be moved into a position of clutch engagement with the gear member to drive the drum and into a position of disengagement from said gear member, control means for the slidable means and reciprocally movable with respect thereto means associated with said shaft for exerting pressure to accelerate the movement of the slidable means to the first mentioned position to insure a positive and complete clutch engagement thereof, and automatic means associated with the shaft, slidable means and control means for locking the slidable means in each position.

3. A winch including a shaft having a drum mounted thereon, a gear member at one end of the drum, means slidably mounted on the shaft and adapted to be moved into a position of clutch engagement with the gear member to drive the drum and into a position of disengagement from said gear member, means associated with said shaft for exerting pressure to accelerate the movement of the slidable means to the first mentioned position to insure a positive and complete clutch engagement thereof, means protruding from said shaft for locking the slidable means in each position, and friction means carried by the slidable member for engaging said drum to stop its momentum.

4. A winch including a shaft having a drum mounted thereon, an extension on one end of the drum and having internal jaws carried thereby, a sleeve slidably mounted on said shaft and having peripheral jaws adapted to engage the jaws of said extension in clutch relation to rotate said shaft and drum, means slidably mounted on said sleeve for moving the sleeve along the shaft to a position to engage said jaws and to a position to disengage said jaws, means associated with said shaft for exerting pressure to accelerate the movement of the sleeve and force its jaws into positive and complete clutch relation with the jaws of said extension, and means for locking said slidable sleeve in each of its positions.

5. A winch including a shaft having a drum mounted thereon, an extension on one end of the drum having internal jaws, a sleeve slidably mounted on said shaft and having peripheral jaws adapted to engage with the internal jaws of the extension, friction means carried by said sleeve, means for moving the sleeve along said shaft in one direction to a position to engage its jaws in clutch relation with the internal jaws of said extension to rotate the drum and in the opposite direction to a position to engage said friction means with said drum to provide a braking action thereon to stop the momentum of the drum, means associated with said shaft for exerting pressure to insure a complete and positive clutch engagement, and means for locking the sleeve in each position.

6. A winch including a shaft having a drum mounted thereon, a gear member at one end of the drum, a sleeve slidably mounted on said shaft and adapted to engage said gear member in clutch relation to rotate said shaft and drum, friction means carried by the sleeve, means for moving the sleeve along said shaft in one direction to a position to engage the gear member in clutch relation to drive the drum and in the other direction to a position to cause the friction means to engage the drum and produce a braking action thereon to stop the momentum of the drum, a spring surrounding the shaft and positioned intermediate the drum and sleeve for exerting pressure to accelerate the movement of the sleeve to insure a complete and positive clutch engagement between said sleeve and gear member, and means for locking the sleeve in each position.

ALBERT E. FREEMAN.
WILLIAM T. LIVERMORE.